United States Patent [19]

Malak

[11] 4,115,925
[45] Sep. 26, 1978

[54] SHAFT ALIGNER

[76] Inventor: Stephen P. Malak, 1720 N. Prospect Ave., Milwaukee, Wis. 53202

[21] Appl. No.: 797,302

[22] Filed: May 16, 1977

[51] Int. Cl.² ............................................. G01B 7/31
[52] U.S. Cl. ................................................ 33/181 R
[58] Field of Search ................ 33/84, 180 R, 180 AT, 33/181 R, 181 AT, 1 N

[56] References Cited

U.S. PATENT DOCUMENTS

| 1,921,508 | 8/1933 | Dawson | 33/174 R |
|---|---|---|---|
| 2,624,944 | 1/1953 | Pujda | 33/26 |
| 2,923,202 | 2/1960 | Trimble | 33/1 R X |
| 3,187,439 | 6/1965 | Leach | 33/181 R |
| 3,279,086 | 10/1966 | Schlitt et al. | 33/324 |
| 4,033,042 | 7/1977 | Bently | 33/181 R |

FOREIGN PATENT DOCUMENTS

| 128,677 | 3/1902 | Fed. Rep. of Germany | 33/180 R |
|---|---|---|---|
| 347,410 | 1/1922 | Fed. Rep. of Germany | 33/180 R |

Primary Examiner—Harry N. Haroian

[57] ABSTRACT

A method and apparatus for statically aligning a first shaft with a second shaft prior to their being connected, one shaft being a reference shaft to which the other shaft is aligned, the apparatus comprising two universal joints having a connection therebetween, one joint each removeably mounted to one of the shafts, each joint having a sensing means operatively associated therewith to provide a signal to an axial reference means indicating angular orientation of the two yokes that comprise each joint, the sensing means ascertaining axial and/or radial misalignment of the two shafts, such that adjusting the position of the second shaft will vary the output of the sensing means on each joint, with alignment of the two shafts indicated by the axial reference means when the two yokes of each joint are shown to be properly oriented with respect to each other.

26 Claims, 15 Drawing Figures

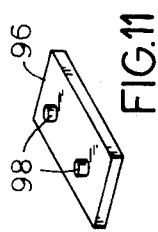
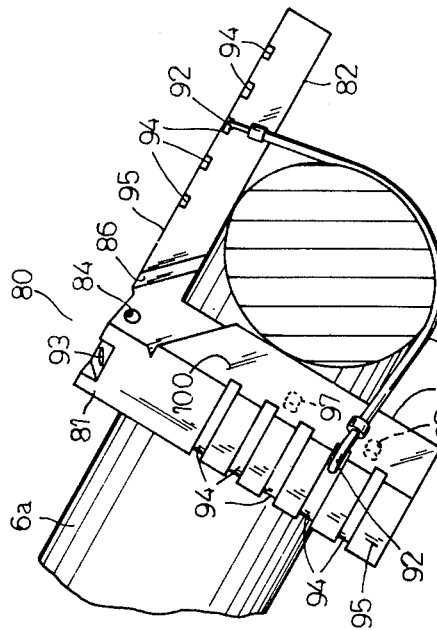
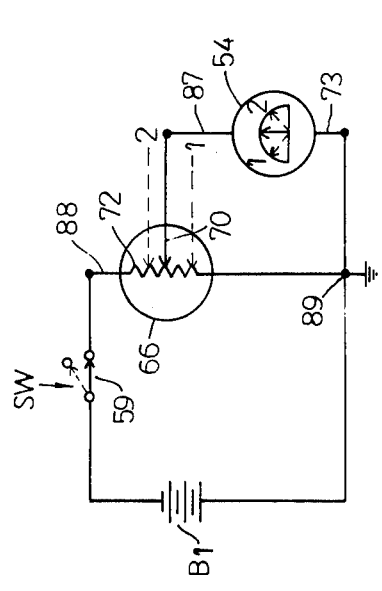
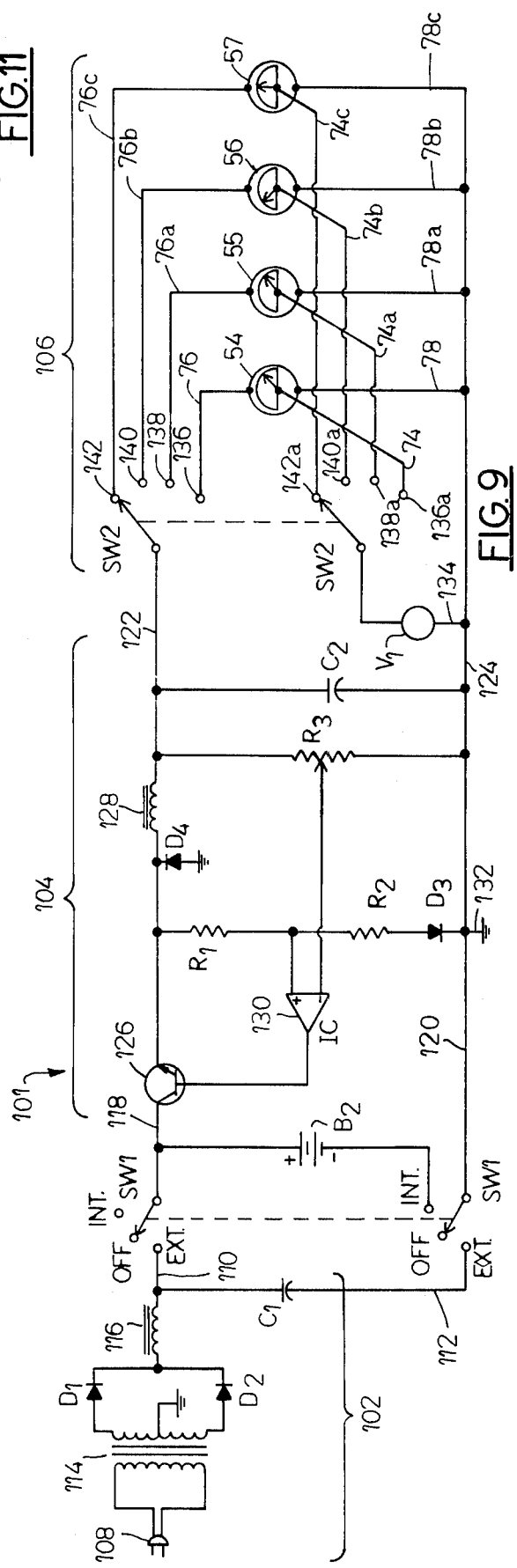

SHAFT ALIGNER

BACKGROUND OF THE INVENTION

1. Field of the Invention

This invention relates to alignment devices directed particularly towards axially and radially aligning a driving shaft with a driven shaft.

2. Description of the Prior Art

The prior art alignment devices such as those described in U.S. Pat. Nos. 3,664,029; 3,733,706; 3,711,955; 2,638,676; 2,636,273; 2,656,607; 2,726,058; and 3,525,158 are generally directed to aligning devices capable of sensing shaft misalignment in two dimensions only, such as axial misalignment. Those that can be used to check for axial and radial misalignment (three dimensional misalignment) must either have the alignment structure moved radially with respect to the shafts to be aligned or must have one of the shafts rotated with respect to the stationary alignment device. This procedure is not only a time-consuming and delicate operation, but introduces error by the constant requirement of moving either the alignment device itself or one of the shafts to be aligned. An additional problem is that in many instances the space available to mount the aligning device is very limited precluding the operator of the aligning device from doing an accurate job. In many instances the shafts are connected to machinery, such as motors and gear boxes, and these cannot be rotated with respect to the alignment device due to the weight, size or mechanical locking forces of the equipment.

Although the prior art has attempted with various structures to overcome these problems, the resulting shaft aligners are not only complicated mechanically making their operation difficult in restricted spaces, but in addition, are costly to manufacture.

SUMMARY OF THE INVENTION

It is, therefore, a general object of this invention to provide a simple method and shaft aligning device particularly directed to statically aligning, in three dimensions, rotating shafts prior to their being coupled.

The shaft aligner of the present invention comprises a pair of universal joints removably mounted, one each on the end of each shaft to be aligned. Each joint comprises two yokes pivotally associated with a support such that each yoke is moveable in three dimensions; one yoke of each joint being removeably mounted to a mounting structure on each shaft, the second yoke of each joint operating with one another through a connecting member. An axial reference sensing means, which may be electrical or mechanical, is operably associated with the support of each joint and the yokes. The reference sensing means is operable with the support and each yoke so that as each yoke is pivoted on the support, a signal is generated by the sensing means showing angular orientation of one yoke with respect to the other. The axial reference means has a defined align mode to which each yoke can be initially calibrated to indicate when the two yokes of each joint are in accurate alignment with respect to each other. Therefore, when the joints are mounted in operative association with each other on the two shafts to be aligned, and one of the shafts is chosen as a reference axis, the second shaft is adjusted and will accordingly vary the signal from the sensing means on each joint. Alignment of the two shafts is achieved when the second shaft is so adjusted that the axial reference means indicates the yokes of each joint are properly oriented with respect to each other.

An additional object of this invention is to provide a shaft aligner which can accurately align in three dimensions (radially and axially) two shafts to be connected without having to move the shaft aligner during the alignment procedure. By this it is meant that neither the shaft aligner structure nor the two shafts themselves have to be rotated with respect to each other to obtain alignment. The only structure moved is the repositioning of the structure to which the second shaft is attached until alignment is clearly indicated by the axial reference means.

A further object of the present invention is to provide a shaft aligner that can be quickly and easily mounted and removed from the shafts to be aligned.

Another object of the invention is to provide a simple mounting structure for each coupling to accommodate for alignment of different diameter shafts.

A still further object of the present invention is to provide a method of aligning two shafts prior to their being connected.

Another object of the invention is to provide a shaft aligner which is compact and easy to operate and adapted for precision alignment.

A further object of the invention is to provide a shaft aligner adaptable to different spacing between the shafts.

A still further object of the present invention is to provide a universal joint particularly suited for operation in shaft alignment.

A further object of the present invention is to provide a shaft aligner which eliminates trial and error methods, is self-contained, self-calibrating and troublefree.

BRIEF DESCRIPTION OF THE DRAWINGS

With reference to the above objects of the invention and other objects and advantages which will appear in the following description taken in connection with the accompanying drawings:

FIG. 8 is an electrical circuit for operation with one of the potentiometers of the present invention;

FIG. 9 is an electrical circuit adaptable for use with four potentiometers;

FIG. 10 is a perspective view showing a first variation of the shaft mounting structure;

FIG. 11 is a perspective view of a spacer used with the mouting structure of FIG. 10;

DESCRIPTION OF THE PREFERRED EMBODIMENT

Figure 1:
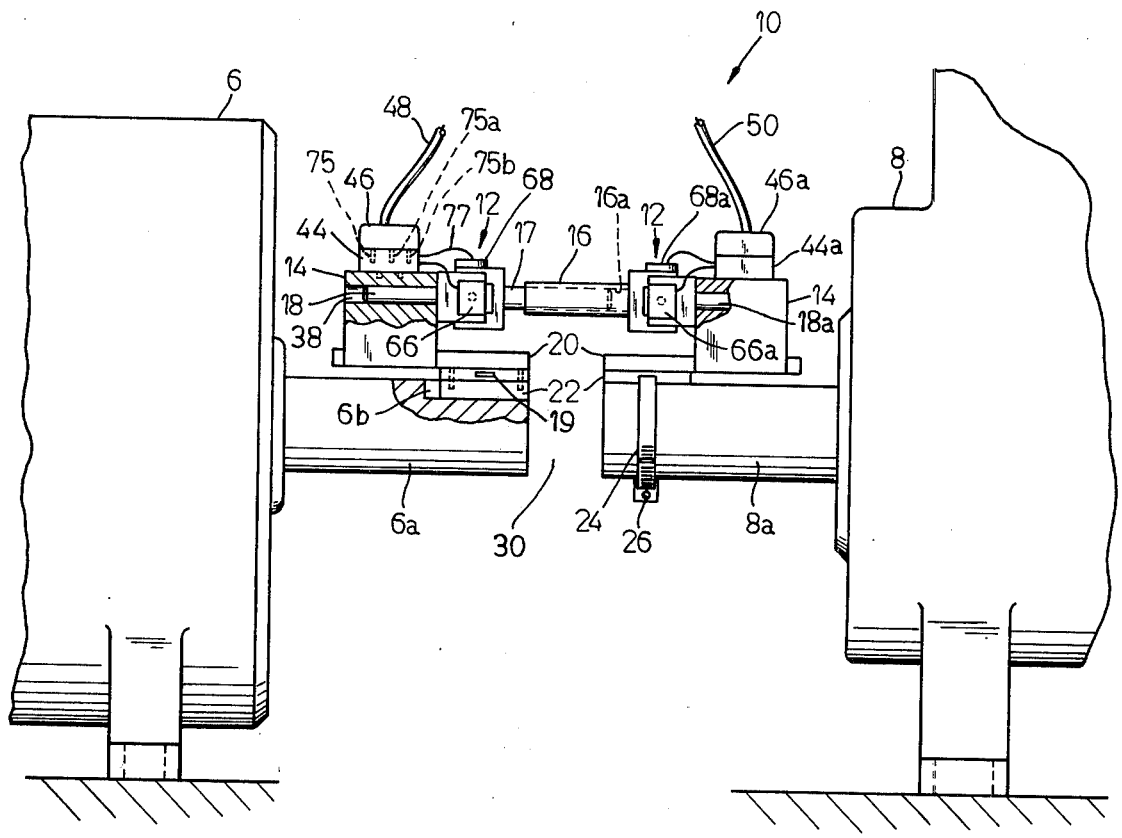
FIG. 1 is a side view of the shaft aligner, partially in section, shown mounted on the shaft ends of a motor and gear box.
Figure 5:
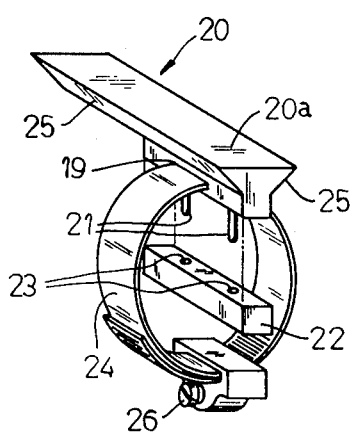
FIG. 5 is a perspective view showing a dovetail slide with which the yoke mounting block cooperates.

Referring in particular to the drawings, FIG. 1 shows the shaft aligner of the present invention generally indicated at 10 as comprising two universal joints 12 each mounted on a mounting block 14. The mounting blocks 14 are removeably fixed to shafts 6a and 8a of a motor 6 and gear box 8, respectively, through dovetail guides 20 and keys 22. The dovetail guide 20 is best depicted in FIG. 5 and comprises a rectangular surface 20a having dovetails 25 which terminate in a lower body portion 19. The lower body portion 19 has two locating pins 21 which mate with holes 23 in key 22. The lower body portion 19, in addition, has passing therethrough an adjustable fastening means 24 to be wrapped around the shaft.

Figure 4:
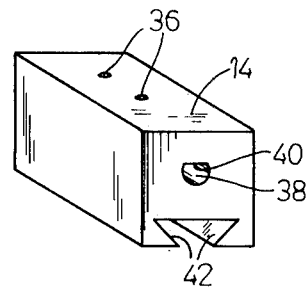
FIG. 4 is a perspective view of a yoke mounting structure.

The dovetail guide is mounted on the shaft in the following manner. Since all shafts have a key slot 6b, an appropriate key 22 having locating holes 23 is selected to fit into the key slot. The dovetail guide 20 is mounted on key 22 with pins 21 located in holes 23. The adjustable fastener 24 is wrapped around the shaft as shown in FIG. 1 (only one shown for simplification) and drawn tight around the shaft by adjustment of the screw block 26. These fasteners are well known, a typical example being adjustable clamps used on water hoses for automobiles. With the dovetail rigidly fixed to the shaft, mounting block 14 (best shown in FIG. 4) is slid on the dovetail with dovetail slot 42 mating with dovetails 25. The mounting block 14 has located longitudinally therethrough a bore 38 having a flat 40. The bore 38 is located in block 14 such that when the mounting block is in position on dovetail 20, the bore 38 will be in radial and axial alignment with the longitudinal axis of the shaft on which it is mounted.

Figure 3:
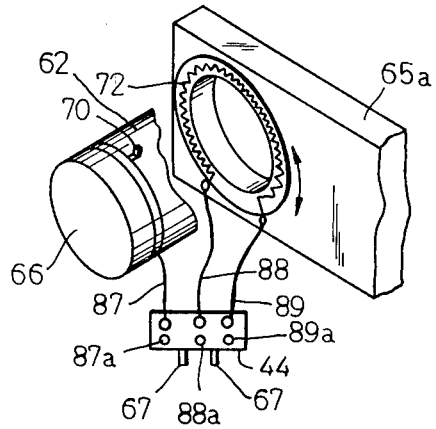
FIG. 3 is a perspective sectional view showing the mounting of a potentiometer on the universal joint support and one of the yoke arms.
Figure 2:
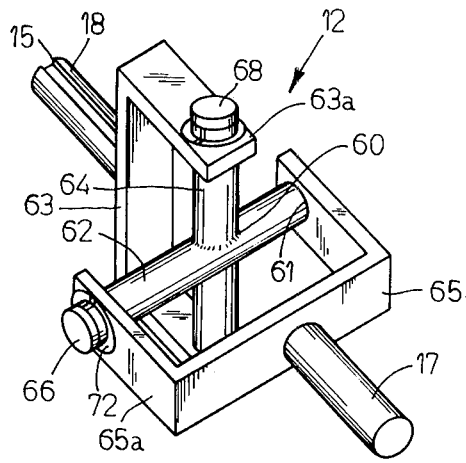
FIG. 2 is a perspective view of one form of the universal joint.

The universal joint 12, best depicted in FIG. 2, comprises a center support 60 having a first yoke 63 (input yoke) and a second yoke 65 (output yoke) pivotally attached to support arms 64 and 62, respectively. The yokes 63 and 65 are preferably mounted at right angles to each other, but this is not necessary. Yoke 63 has fixed to it at a right angle a support shaft 18 having a flat 15. Yoke 65 has fixed to it at a right angle a support shaft 17. Each universal joint 12 (see FIG. 1) has operatively associated therewith axial reference means comprising: first axial sensing means 66, 68 and second axial sensing means 66a and 68a; electrical leads 48 and 50; and an alignment readout means 52. The axial sensing means 66 and 68 is operatively connected between the support 60 and one arm of yoke 65a and one arm of yoke 63a, respectively. The first and second axial sensing means can in one form comprise first and second electrical sensors, respectively, which can as example by of the resistive type (potentiometer), the capacitive type, inductive type, or a combination of one or another. The first axial sensing means is best shown in FIG. 3 and in one form comprises a first electrical means including electrical sensors in the form of potentiometers 66 and 68. Potentiometer 66 has a resistance wire 72 fixed radially on arm 65a of yoke 65. The resistance wire 72 terminates at ends 88 and 89 which are connected to terminal connector 44. A slide member 70 of potentiometer 66 is secured to arm 62 of the support and terminates in an end 87 also connected to terminal connector 44. It is clear then that as yoke 65 pivots on support 60 the resistance wire 72 will move pass slide member 70. The universal joint described contemplates, when necessary, the use of appropriate electrical insulation, well known by those skilled in the art, between the resistance wire and yoke arm on which it is mounted and between the slide contact and the support.

In a similar manner, the potentiometer 68 is mounted and oriented between center support 60 and yoke 63. The slide members 70 can be positioned on the support arms 62 and 64 of each joint such that it contacts each resistance wire 72 midway between its ends when the longitidinal axis of the support shaft 17 and the support shaft 18 are in axial and radial alignment. Both universal joints 12 are similarly constructed and mounted in the following manner viewing FIG. 1. The universal joint 12 to the left in FIG. 1 is mounted by inserting support 18 into bore 38 of the mounting block 14, with flat 15 mating with flat 40 in the bore. Although a flat is indicated in bore 38 and on shaft 18, it is not necessary as the device will work without them. However, it helps positioning the joints for easy connection of the terminal connector 44 to block 14. With joint 12 mounted on block 14 the terminal connector 44 is mounted to the block 14 by inserting pins 44a on connector 44 into holes 36 in the top of the block (see FIGS. 3 and 4). After this has taken place, an electrical connector plug 46 having lead 48 is connected to terminal connector 44 such that electrical pin contacts 75, 75a and 75b make electrical contact with leads 87, 88 and 89, respectively, from potentiometer 66. In like manner, the electrical leads 77 from potentiometer 68 are connected at similar terminals on terminal connector 44 for connection with a second set of electrical pin contacts 75, 75a and 75b (not shown for simplification).

Once one joint 12 is mounted, the second joint 12 is mounted in like manner on the second shaft. The only difference between the two joints 12 is that the right joint has a shaft 16 with a bore 16a to receive shaft 17 in telescoping fashion. Although a telescoping connector member is shown between shafts 16 and 17, to permit accommodating a varying spacing 30 between the ends of shafts 6a and 8a, a solid connector member extending between and providing an operating connection between the two joints is equally workable. If a solid shaft is used it will have its ends threaded for screwing into appropriate holes in the connecting yokes of each joint. When the solid shaft is used, the mounting blocks 14 are simply moved to a convenient location on the dovetail guides 20 to permit sufficient space to mount the joints into the respective bores of the mounting blocks.

In like manner (as previously discussed for potentiometers 66 and 68), a connector plug 46a with lead 50 is connected to terminal block 44a to provide electrical contact with separate electrical leads from the second axial sensing means in one form comprising second electrical means including potentiometers 66a and 68a located on the second universal joint.

Figure 1A:
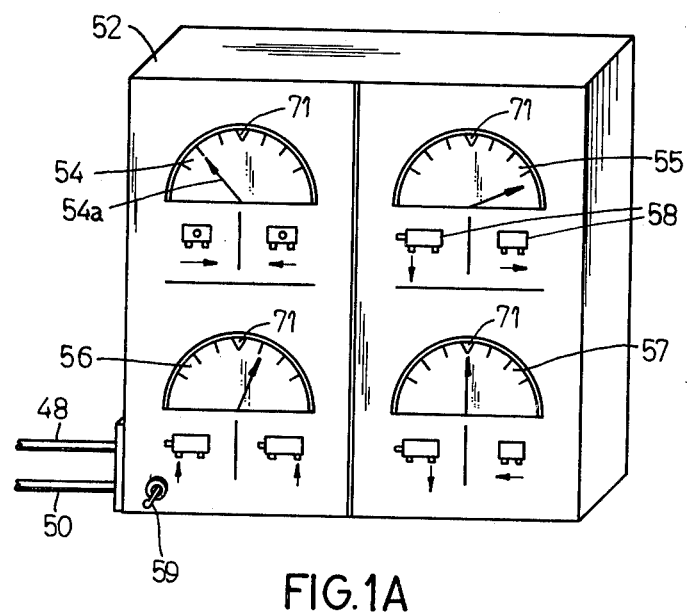
FIG. 1a is a perspective view of one form of axial reference means alignment readout device included in the sending means of the invention.

The leads 48 and 50 are connected to one form of an alignment readout means 52 having defined align nodes 71 shown in FIG. 1a. The leads 48 and 50 are connected internally to the alignment readout means which in one form comprises an electrical readout means including an electric circuit to be discussed later which provides an output signal to readout meters 54, 55, 56 and 57. These meters may, as examples, either be voltmeters, ammeters or null-meters well known in the art. The alignment readout neans is equipped externally with an on-off switch 59. The meters 54, 55, 56 and 57 are set so that full scale swing of the meter pointer, such as 54a, will take place with a full scale swing of slide member 70 on resistance wire 72 of potentiometer 66. The swing of pointer 54a and slide member is preferably in linear relation but this is not necessary. The outputs of potentiometers 68, 66a and 68a are similarly connected through the electric circuit to meters 55, 56 and 57, respectively. In this manner any change in orientation of any one of the slide members of the potentiometers is reflected clearly in meters 54, 55, 56 and 57. There can also be located in association with each meter a set of symbols 58, as at meter 55, to indicate to the operator which direction he should move the gear box 8 (as example) so as to position the pointer of each meter at its align node 71.

As noted before, the slide members of each potentiometer are preferably set at the midpoint of the resistance wire. The meter reading of each potentiometer at this point will be fixed at the align node 71 defined on each meter. At this node the potentiometer is indicating that the support shaft of the yoke with which it is operating is aligned axially and radially with the support shaft of the second yoke of that joint.

Alignment of the two shafts 6a and 8a is simply accomplished in the following manner. One shaft is chosen as the reference shaft to which the other will be aligned. It should be noted that since the shaft a ligner structure permits static alignment of the two shafts, it is not necessary that one of the shafts be chosen as a reference shaft. Choosing a reference shaft is preferable since the operator has only to shim or de-shim the housing to which the other shaft is connected. Either can be chosen and for illustration purposes 6a is chosen. The method of shaft aligning comprises the steps of: providing a first universal joint and mounting it on the first shaft; providing a second universal joint and mounting it on the second shaft; providing an axial reference means operatively associated with the first universal joint and the second universal joint, the axial reference means having a defined align node and providing a signal indicating angular orientation of the support shafts of the yokes of each universal joint; providing a connecting member between the two universal joints; and adjusting the first shaft with resepct to the second shaft until the yokes of the first joint and the yokes of the second joint are each oriented to provide a signal at the align node of the axial reference means. With reference to FIG. 1, this simply means that once the universal joints are mounted on the shafts and connected to the electrical readout device, the operator simply repositions gear box 8 on its support legs by appropriate movement and shimming until all of the meters 54, 55, 56 and 57 have their pointers positioned at the align node for that meter similar to that shown by meter 57. When this is achieved, the operator knows that the longitudinal axis of the support shafts of each yoke or the respective joints are in axial and radial alignment. At this point support shafts 16, 17, 18 and 18a of the joints are in perfect axial and radial alignment. Correspondingly, the shafts 6a and 8a are also in accurate axial and radial alignment.

Figure 6:
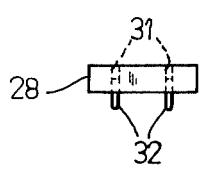
FIG. 6 is a side view of a spacer used with the dovetail slide.

FIG. 1 shows the mounting structure for aligning shafts of the same diameter. For aligning shafts of different diameters a spacer block is needed as shown in FIG. 6. The spacer block 28 has locating pins 32 and holes 31 and is mounted between the dovetail guide 20 and key 22 shown in FIG. 5. The pins 32 mate with holes 23 in the key, and the pins 21 on the dovetail guide mate with holes 30 in the spacer.

The spacer chosen must be equal in thickness to one-half the difference between the diameters of the two shafts. The spacer block is located on the dovetail guide mounted on the smaller diameter shaft. In this manner, shafts of different diameters can be easily and accurately aligned.

Figure 7:
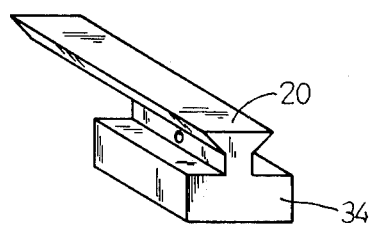
FIG. 7 is a perspective view showing the dovetail slide integral with a key.

FIG. 7 depicts of dovetail guide 20 integral with a key block 34 in lieu of making them separate structures.

One form of electrical circuit for use with each potentiometer is shown in FIG. 8. A source of direct current electrical energy, such as a dry cell battery is shown at $B_1$, is connected at one end to terminal 89 and at the other to terminal 88 through switch SW. The potentiometer 66 (depicted in electrical symbol) has the terminal ends of its resistance wire 72 connected to terminals 88 and 89. The slide contact 70 has its lead connected to terminal 87 to which is also connected one side of a voltmeter 54. The other side 73 of the voltmeter is connected to terminal 89 or chassis ground. The voltmeter accordingly measures the voltage across that portion of the resistance wire between slide contact 70 and ground. The potentiometer resistance is selected such that full scale swing of the slide contact over the resistance wire will cause full scale swing of the pointer of the voltmeter. Accordingly, when the slide contact is at the midpoint of the resistance wire, the voltmeter pointer will be fixed at the align node 71. Any movement of the slide contact from the midpoint as to positions 1 and 2 will cause the pointer to move to positions 1a and 2a, respectively.

The other potentiometers can also be connected in the same fashion to similar circuits, each providing a signal to voltmeters 55, 56 and 57, respectively. The switch 59 is a four-pole single-throw switch common to all circuits and set to open and close all four circuits simultaneously.

The electrical circuit of FIG. 8 requires the use of four voltmeters and four dry cell batteries. Although it is the simplest circuit to use, a circuit requiring only one voltmeter is shown in FIG. 9 where all four potentiometers utilize a common source of electric energy and electrical circuit, and where each potentiometer can be individually selected for readout by the operator. The circuit permits the operator to use an internal electrical source, as a dry cell battery, or an external alternating current source when available and convenient. In addition, the circuit will provide a very accurately regulated direct current voltage input to the potentiometers.

The circuit is generally depicted at 100 and comprises an alternating current converter power supply 102 (hereinafter called A.C. power supply), a switching regulator 104 and a potentiometer select 106. Both the A.C. power supply 102 and switching regulator circuit 104 are very well known in the art, one reference for their detailed operation being Switching Regulators and Power Supplies with Practical Inventors and Converters, by Irving Gottlieb, Printed January 1976 (Library of Congress Card No. 75-41722).

Briefly, the A.C. power supply 102 simply converts alternating current from a source 108 to a supply of direct current at terminals 110, 112 across capacitor $C_1$. The A.C. supply 102 consists of an iron core transformer 114, diodes $D_1$ and $D_2$, a filter choke 116 and capacitor $C_1$, connected in the arrangement shown. The A.C. power supply is connected to the switching regulator 104 through one side of a double-pole double-throw swtich SW1. The other side of switch SW1 is connected to an internal source of direct current $B_2$ such as a dry cell battery. Switch SW1 has a middle OFF position permitting the operator to switch to the EXT poles (the A.C. power supply) or to the INT poles (the internal power supply $B_2$).

The switching regulator 104 takes the source of varying input direct current at terminals 118, 120 and provides a precisely controlled direct current output voltage across terminals 122, 124 of capacitor $C_2$. A precisely controlled voltage across these terminals is desired since the voltmeter $V_1$ and potentiometers 54, 55, 56 and 57 will be chosen to operate within a preselected voltage range and tolerance.

The switching regulator 104 comprises an NPN transistor 126, resistors $R_1$, $R_2$ and $R_3$, diodes $D_3$ and $D_4$, filter choke 128, an integrated circuit (IC) operational amplifier 130, and a capacitor $C_2$ connected in the manner shown. The integrated circuit operational amplifier (also called an op-amp in the art) can also be an integrated circuit linear regulator which is simply an op-amp with an excellent preselected self-contained voltage reference.

The regulated direct current output voltage from the switching regulator 104 is connected to the potentiometer select circuit 106 at terminals 122 and 124. Terminal 122 is connected to a double-pole rotary contact switch SW2, and terminal 124 is connected to chasis ground 132. The other side of switch SW2 is connected to one side of voltmeter $V_1$ which has its other lead 134 connected to chasis 132. The potentiomers 54, 55, 56 and 57 each have one end of their resistance wires 76, 76a, 76b and 76c, respectively, connected to poles 136, 138, 140 and 142 of switch SW2. The other end of the resistance wires 78, 78a, 78b and 78c are connected to chasis ground 132. The slide contacts 70 of each potentiometer are connected by leads 74, 74a, 74b and 74c to poles 136a, 138a, 140a and 142a of switch SW2, respectively. In this manner, switch SW2 permits the operator to individually select the output signal of each potentiometer for individual readout on voltmeter $V_1$.

After the universal joints are appropriately mounted on the shafts to be aligned, the potentiometers 66, 68, 66a and 68a are connected to circuit 100 through cables 48 and 50. Cable 48 from potentiometers 66 and 68 consists of leads 74, 74a; 76, 76a; and 78, 78a. Cable 50 from potentiometers 66a and 68a consists of leads 74b, 74c; 76b, 76c; and 78b, 78c. The cables are connected to the circuit through appropriate connector plugs well known in the art. Once the circuit 100 is connected electrically to the potentiometers and provided with power, the operator can visually see, by selectively turning switch SW2, the degree of misalignment of the two shafts and accordingly adjust one of them until the potentiometers all provide a signal that positions the pointer on the voltmeter at the align node. When this is achieved, the two shafts are in axial and radial alignment.

The mounting structure described in FIGS. 1 and 4 thru 7 is dependent on the use of the key slot in each shaft. A mounting structure not dependent on the key slot is shown in FIG. 10. Only one structure is shown as the other is similarly made.

The mounting structure is generally indicated at 80 and comprises a v-shaped bar 81 having inner surfaces 82 defining a 90° angle. The structure 80 is mounted on shaft 6a with surfaces 82 contacting the shaft surface. It is clear that this structure is easily adaptable to varying size shaft diameters. The structure 80 is removeably secured to the shaft by the use of a resilient strap 90 having at its ends hooks 92 which are connected, as convenient, to one of the slots 94 on each outer surface 95. A bore 84 is located in bar 81 for receiving the support shaft from the universal joint. The bore 84 is longitudinally aligned with the surface 82 such that when the bar 81 is mounted on the shaft, the axis of bore 84 will be axially and radially aligned with the longitudinal axis of the shaft.

A slot 86 is located on the front face 100 to receive the back face 85 of the yoke of the universal joint. The slot is aligned perpendicular to the axis of bore 84 and fixedly orients the yoke of the universal joint with the structure 80. The slot is not necessary, but is helpful to the operator in orienting the electrical leads for connection to the axial reference readout device.

A water level 93 may be located (but is not necessary) at the top of structure 80 to help minimize the time in adjusting one shaft relative to the other to achieve alignment. The structure 80 is oriented on each shaft with the water bubble of the level 93 approximately centered between the gradation lines. Use of the water level is well known and no further description is deemed necessary.

It can be seen that structure 80 can be quickly mounted and removed from the shaft. Again, as before, if shafts of different diameters are being aligned, spacers 96 as shown in FIG. 11 can be used to compensate for the shaft diameter difference. The spacers 96 have a pair of pins 98 which mate with holes 97 in surface 82. Two spacers are needed, one for each surface 82. The thickness of the spacer chosen must be equal to one-half the difference between the diameters of the two shafts. The spacers are located on the structure 80 mounted on the smaller of the two shafts.

Figure 12:
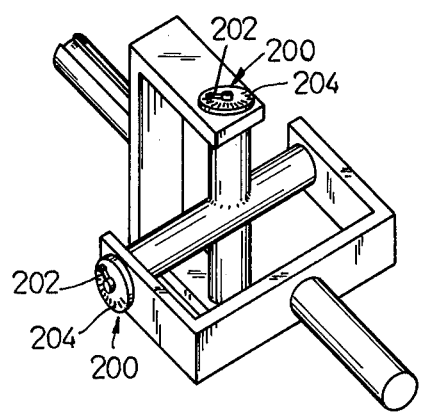
FIG. 12 is a perspective view showing a first variation of the universal joint having a mechanical axial reference.

Although the potentiometer has been described as an example of the electric sensing means for sensing angular orientation of the yokes in the universal joint, it is possible to use a mechanical sensing means as shown in FIG. 12. In lieu of each potentiometer, there is located a mechanical dial indicator 200, the pointer 202 of which is fixed to the center support and the dial scale 204 fixed to the arm of the yoke. As before, the universal joint is initially calibrated so that the pointer is set on the align node of each dial scale when the support shafts of each yoke are in perfect axial and radial alignment. Once calibrated, the universal joints can be mounted on the mounting structures described previously and connected by either a solid connecting shaft or telescoping shaft as described in FIG. 1.

To align the two shafts, the operator merely adjusts one shaft relative to the reference shaft until the four pointers of the four dial indicators all line up with the align node on each dial scale. When this is achieved, the supporting shafts of the two universal joints are in perfect axial and radial alignment and correspondingly the two shafts being aligned are also axially and radially aligned.

Figure 13:
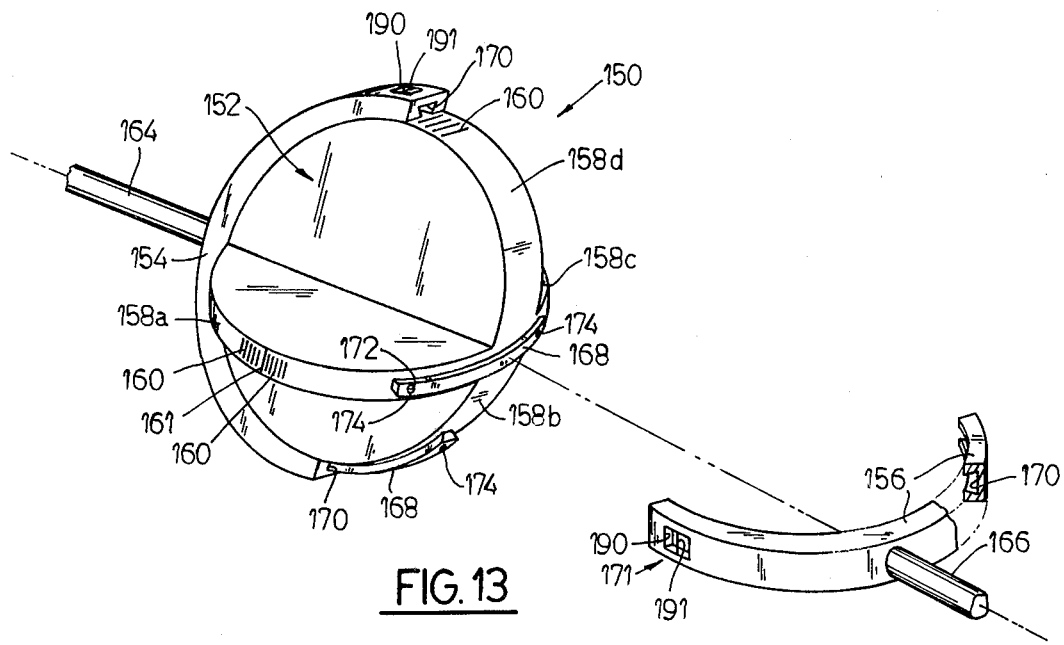
FIG. 13 is a perspective view showing a second variation of the universal joint having a mechanical axial reference.

A second variation of the universal joint having a mechanical sensing means is shown in FIG. 13. As with the joint in FIG. 12, in lieu of each potentiometer there is located a mechanical slide 171 and graduated scale 160. The slide is mounted on one arm of the yoke and the graduated scale is located on the center support. The universal joint is generally depicted at 150 and comprises a center support 152 and two yokes 154 and 156. Yoke 156 is shown disconnected from the center support for clarification. The support 152 is spherical in shape having four sections cut out to define four discs integrally connected: 158a, 158b, 158c and 158d. Two discs, such as 158a and 158d, have gradations 160 marked on them visible to the eye, with one centrally located gradation called the align node 161. The align node gradation lies in a plane going through the center of the support sphere. Support shafts 164 and 166 are mounted on yokes 154 and 156, respectively, such that they are in axial and radial alignment when the hairline 191, located in window 190 of each yoke, is aligned with the align node 161 on the disc with which it is operatively associated.

The yokes 154 and 156 are mounted on the support for three dimensional universal movement through dovetail guides 168. Each yoke has a dovetail slot 170 which slidingly mates with dovetail guides 168. The dovetail guides have a pair of openings 172 for receiving screws 174 for fastening to the support. The dovetail guides are mounted on the support such that they lie on planes passing through the center of the support, which planes are perpendicular to each other. The universal joint is assembled as follows. The dovetail guides are first slid, one each, into one of the yokes. The dovetail guide is then moved within slot 170 to one side until one of the openings 172 is exposed. A screw 174 is then inserted into the opening and fastened to an appropriate receiving tap in the support. After partially screwed, the yoke is moved on the dovetail guide until the other opening 172 is exposed and another screw 174 is inserted and fastened to another appropriately located receiving tap in the support. Then both screws are secured tightly to fix the dovetail guide to the support. Likewise, the second yoke is similarly connected. Once attached, the yokes are universally mounted on the support and cannot slide off the support.

Shaft alignment with universal joints 150 is as follows. After one of the mounting structures 80 described previously is mounted on each shaft to be aligned, a universal joint 150 is mounted on each mounting structure through shaft 164, similar to the universal joints described previously. The universal joints are operatively connected by either a solid shaft or telescoping shaft also described previously. With one shaft chosen as a reference shaft, the operator adjusts the second shaft until the hairline 191, located in each window 190 of the four yokes, lines up with the align node 161 on each respective disc. When this is achieved, the support shafts of the respective universal joints are in perfect axial and radial alignment and correspondingly the shafts being aligned are also axially and radially aligned. The joints 150 and respective mounting structure are then removed so that the two shafts can be coupled for joint operation.

Figure 14:
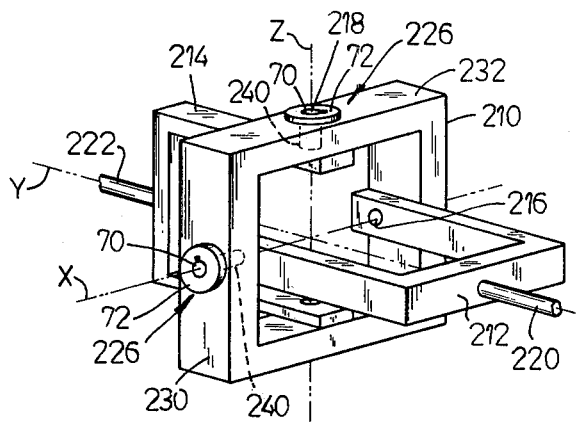
FIG. 14 is a perspective view showing a third variation of the universal joint.

Although the universal joints described each show two yokes pivotally mounted on a center support, the present invention is not limited to that structure. The inventor also envisions the use of a universal joint with the two yokes pivotally mounted to a support located externally around the yoke. One example is shown in FIG. 14, where the outer support is in the form of a square ring 210 with yokes 212 and 214 pivotally mounted for universal movement to the internal surface of the ring by pins 216 and 218, respectively. The pins are fixed to the yoke arms for rotational movement within appropriate bores 240 in the ring. The bores preferably lie in the same plane passing through the center of the ring, with the longitudinal axis of the bores being perpendicular to each other. Electric sensing means in the form of potentiometers 226 and 228 mounted on pins 216 and 218, respectively, have their resistance wires 72 mounted to surfaces 230 and 232, respectively. The slide contacts 70, of each potentiometer, are fixed to the pins 216 and 218. Electrical leads from the potentiometers are connected in similar fashion to the joints described in FIG. 1. Accordingly, any reference in this specification to the universal joint support or to the support is a term intended to encompass supports for the yokes located internally and/or externally of the joint.

While I have shown and described the preferred embodiments, various modifications and changes to the structure and their mode of operation may be made by those skilled in the art without departing from the true spirit and scope of the invention as defined in the accompanying claims.

I claim:

1. A method of statically aligning a first shaft with a second shaft, wherein the first shaft has mounted thereon a first universal joint and the second shaft has mounted thereon a second universal joint, the first universal joint and second universal joint having a connection therebetween, the first universal joint carrying a first axial reference means, and the second universal joint carrying a second axial reference means, and an alignment readout means having a defined align mode, comprising the steps of:
   sensing the angular orientation of the first universal joint with respect to the first axial reference means and providing a first signal indicating this angular orientation;
   sensing the angular orientation of the second universal joint with respect to the second axial reference means and providing a second signal indicating this angular orientation;
   sensing the first and second signals on the alignment readout means for visual display; and
   adjusting the first shaft with respect to the second shaft until the first universal joint and second universal joint are oriented to provide their respective signals at the align node.

2. A method of aligning a first shaft with a second shaft as recited in claim 1 wherein the first universal joint comprises a first yoke and a second yoke pivotally mounted on a first support, with the first axial reference means sensing angular orientation of the first yoke with respect to the second yoke, and the second universal joint comprises an input yoke and an output yoke pivotally mounted on a second support, with the second axial reference means sensing angular orientation of the input yoke with respect to the output yoke.

3. A method of aligning a first shaft with a second shaft, as recited in claim 2, wherein the first axial reference means is first electrical sensor and the second axial reference means is second electrical sensor and wherein the first signal and the second signal are electrical signals.

4. A method of aligning a first shaft with a second shaft, as recited in claim 3, wherein the first electrical sensor comprises a first potentiometer mounted between the first yoke and first support and providing a first potentiometer signal and a second potentiometer mounted between the second yoke and first support and providing a second potentiometer signal, and wherein the second electrical sensor comprises an input potentiometer mounted between the input yoke and second support and providing an input potentiometer signal and an output potentiometer mounted between the output yoke and second support and providing an output potentiometer signal.

5. A method of aligning a first shaft with a second shaft as recited in claim 4 wherein the readout means is selectively responsive to the first potentiometer signal, second potentiometer signal, input potentiometer signal and output potentiometer signal.

6. A method of aligning a first shaft with a second shaft as recited in claim 2 wherein the first axial sensing means is first mechanical means and the second axial sensing means is second mechanical means and wherein the first signal and second signal are electric signals.

7. A method of statically aligning a first shaft with a second shaft prior to their being coupled wherein the first shaft has mounted thereon a first universal joint comprising a first yoke and a second yoke pivotally mounted on a first support, and the second shaft has mounted thereon a second universal joint comprising an input yoke and an output yoke pivotally mounted on a second support, the first universal joint and second universal joint having a connection therebetween, comprising the steps of:

providing first axial sensing means mounted on the first universal joint and providing a first signal indicating angular orientation of the first yoke with respect to the second yoke;

providing second axial sensing means mounted on the second universal joint and providing a second signal indicating angular orientation of the input yoke with respect to the output yoke;

sending the first signal and second signal to an alignment readout means having a defined align mode indicating shaft alignment; and adjusting the first shaft with respect to the second shaft until the first yoke and second yoke are oriented at the align node, and the input yoke and output yoke are oriented at the align node.

8. A method of aligning a first shaft with a second shaft as recited in claim 7 wherein first axia sensing means comprises a first electrical sensor connected between the first yoke and the first support, and second electrical sensor connected between the second yoke and first support, and wherein the second axial sensing means comprises an input electrical sensor connected between the input yoke and second support and an output electrical sensor connected between the output yoke and second support.

9. A method of aligning a first shaft with a second shaft as recited in claim 8 wherein the alignment readout means is responsive to a first electrical signal from the first electrical sensor, a second electrical signal from the second electrical sensor, an input electrical signal from the input electrical sensor and an output electrical signal from the output electrical sensor.

10. A shaft aligner for statically aligning a first shaft with a second shaft comprising:

a first universal joint comprising a first yoke and a second yoke pivotally mounted on a first support;

a second universal joint comprising an input yoke and an output yoke pivotally mounted on a second support;

first axial sensing means mounted on the first universal joint to sense angular orientation of the first yoke with respect to the second yoke and providing a first signal and a second axial sensing means mounted on the second universal joint to sense angular orientation of the input yoke with respect to the output yoke and providing a second signal;

means for mounting the first yoke to the first shaft;

means for mounting the input yoke to the second shaft;

a connector member connecting the second yoke to the output yoke; and alignment readout means having a defined align node and responsive to the first signal and second signal for visually displaying shaft alignment, whereby with adjustment of the first shaft with respect to the second shaft alignment of the first shaft with the second shaft will be indicated by the alignment readout means when the first yoke and the second yoke are oriented at the align node, and the input yoke and the output yoke are oriented at the align node.

11. A shaft aligner as recited in claim 10 wherein the first axial sensing means comprises a first electrical sensor mounted between the first yoke and the first support and a second electrical sensor mounted between the second yoke and first support, and wherein the second axial sensing means comprises an input electrical sensor mounted between the input yoke and second support and an output electrical sensor mounted between the output yoke and second support.

12. A shaft aligner as recited in claim 11 wherein the first electrical sensor comprises a first potentiometer mounted between the first yoke and first support and providing a first potentiometer signal, the second electrical sensor comprises a second potentiometer mounted between the second yoke and first support and providing a second potentiometer signal, and wherein the input electrical sensor comprises an input potentiometer mounted between the input yoke and second support and providing an input potentiometer signal and the output electrical sensor comprises an output potentiometer mounted between the output yoke and second support and providing an output potentiometer signal.

13. A shaft aligner as recited in claim 12 wherein the alignment readout means is selectively responsive to the first potentiometer signal, second potentiometer signal, input potentiometer signal and output potentiometer signal.

14. A shaft aligner as recited in claim 11 wherein the first electricl sensor provides a first electrical signal, the second electrical sensor provides a second electrical signal, the input electrical sensor provides an input electrical signal and the output electrical sensor provides an output signal.

15. A shaft aligning universal joint, comprising:
a support;
a first yoke pivotally connected to the support;
a second yoke pivotally connected to the support; and
axial sensing means mounted on the support, first yoke and second yoke, the axial sensing means having a defined align node to indicate angular orientation of the first yoke with respect to the second yoke.

16. A shaft aligning universal joint as recited in claim 15 wherein the axial sensing means comprises a first sensor mounted between the first yoke and the support, and a second sensor mounted between the second yoke and the support.

17. A shaft aligning universal joint as recited in claim 16 wherein the first sensor provides a first signal indicating angular orientation of the first yoke with respect to the support, and the second sensor provides a second signal indicating angular orientation of the second yoke with respect to the support.

18. A shaft aligning universal joint as recited in claim 17 further including an alignment readout means indicating the align node, the readout means being selectively responsive to the first signal and the second signal.

19. A shaft aligning universal joint as recited in claim 17 wherein the first sensor is first electrical sensor and the second sensor is second electrical sensor and wherein the first signal and the second signal are electrical signals.

20. A shaft aligning universal joint as recited in claim 19 wherein the first electrical sensor comprises a first potentiometer mounted between the first yoke and first support and providing a first potentiometer signal and the second electrical sensor comprises a second potentiometer mounted between the second yoke and first support and providing a second potentiometer signal.

21. A shaft aligning universal joint as recited in claim 17 wherein the first sensor is first mechanical sensor and the second sensor is second mechanical sensor and wherein the first signal and second signal are mechanical signals.

22. A shaft aligning universal joint as recited in claim 21 wherein the first mechanical sensor is a mechanical dial indicator and the second mechanical sensor is a mechanical dial indicator.

23. A shaft aligning universal joint as recited in claim 21 wherein the first mechanical sensor is a first mechanical slide and graduated scale and wherein the second mechanical sensor is a second mechanical slide and graduated scale.

24. A shaft aligning universal joint, comprising:
a support:
a first yoke pivotally mounted on the support;
a second yoke pivotally mounted on the support;
first sensing means connected between the first yoke and the support and providing a first signal indicating angular orientation of the first yoke with respect to the support; and
second sensing means connected between the second yoke and the support and providing a second signal indicating angular orientation of the second yoke with respect to the support.

25. A shaft aligning universal joint, comprising:
a support;
a first yoke pivotally connected to the support;
a second yoke pivotally connected to the support; and axial electrical sensing means mounted on the first yoke and the second yoke and providing a signal indicating angular orientation of the first yoke and second yoke with respect to the support.

26. A shaft aligning universal joint, comprising:
a support;
a first yoke pivotally connected to the support;
a second yoke pivotally connected to the support; and
axial electrical sensing means mounted on the first yoke and second yoke and providing a first signal indicating angular orientation of the first yoke with respect to the second yoke and a second signal indicating angular orientation of the second yoke with respect to the first yoke.

* * * * *